A. E. SMITH.

Carriage-Axle.

No. 6,694.

Reissued Oct. 11, 1875.

Attest:
Jos. S. Coombs
A. H. Norris

Inventor.
Alfred E. Smith
By James L. Norris.
Atty

N. PETERS, PHOTO-LITHOGRAPHER, WASHINGTON, D. C.

UNITED STATES PATENT OFFICE.

ALFRED E. SMITH, OF BRONXVILLE, NEW YORK, ASSIGNOR TO FRANK D. SLOAT, OF MIDDLETOWN, CONNECTICUT.

IMPROVEMENT IN CARRIAGE-AXLES.

Specification forming part of Letters Patent No. 98,436, dated December 28, 1869; reissue No. 3,991, dated May 24, 1870; reissue No. 6,694, dated October 11, 1875; application filed July 8, 1875.

DIVISION A.

*To all whom it may concern:*

Be it known that I, ALFRED E. SMITH, of Bronxville, in the county of Westchester, State of New York, have invented certain new and useful Improvements in Carriage-Axles, of which the following is a specification, reference being had to the accompanying drawings, in which—

Figure 1:
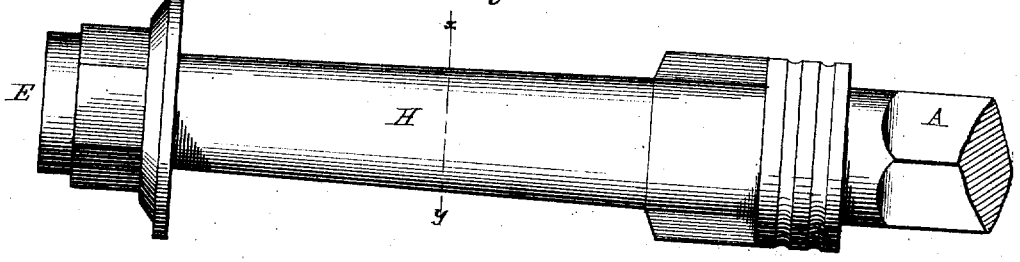
Figure 2:
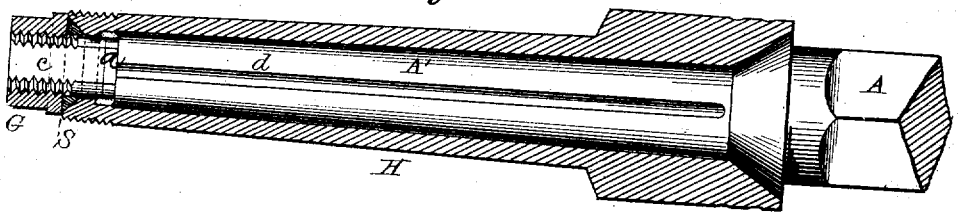
Figure 3:
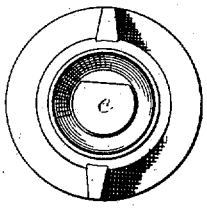
Figure 4:
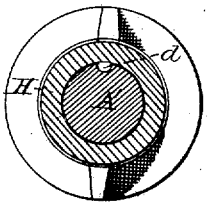
Figure 5:
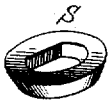

Figure 1 is a view of my improved axle complete Fig. 2 is a vertical longitudinal section of the same with the cap-nut removed. Fig. 3 is an end view with the cap-nut removed. Fig. 4 is a transverse section of the spindle and axle-box. Fig. 5 is a perspective view of the follower.

This invention relates to certain improvements in carriage-axles; and consists in combining a conical washer with the axle-spindle and the axle-box, the said parts being so constructed and arranged as to form a recess between them, for admitting of compensating for wear and for lubricating purposes.

In the drawings, A represents the axle; A′, the spindle or journal, formed with a groove or channel, *d*, extending from the shoulder, more or less, the full length of the axle-spindle A′. The outer end of this spindle, upon which the nut G is screwed, is flattened upon one side to a shape corresponding with the bore of the conical follower, whether D or any other shape. This form of the nib of the spindle may be seen at *c*, Fig. 3, and is given for the purpose of holding the conical follower firmly, and preventing its revolution on the spindle. Upon this segmentally-shaped spindle end is placed a follower, S, formed of steel, iron, or other material, conical in form, its angular face being presented to the spindle, and having a bore or orifice, which corresponds in form with the segmental or other shape given to the tip of the axle.

The axle-box is of the usual construction, with the exception that it is formed with a beveled cavity at its front end to receive the abutting inclined surface of the conical washer S, and a recess, *a*, between the bevel-point of the follower and the front shoulder of the axle-spindle A′. Into this recess *a* the lubricating substance is conveyed by the channel or groove *d*, formed either in the spindle or the axle-box. The object of this groove is to furnish means for a thorough lubrication of the spindle A′ and the concave portion on the front of the axle-box H, which bears on the beveled periphery of the conical follower S.

G represents the nut fitted to the threads formed on the nib of the spindle A′, serving the purpose of retaining the axle-box H upon the spindle, and of drawing the conical follower closely against the end of the beveled end of the axle-box, causing the wheel to run steady and true.

Upon the outer end of the axle box or skein H is formed a screw-thread, upon which is screwed a capped nut, E, designed to cover the axle-nut G, and at the same time prevent the wheel-hub from slipping off of the axle-box should the latter become loose in the hub. It also prevents sand or other foreign substances from entering the follower and spindle.

Having described my invention, what I claim is—

1. The combination, with the conical follower, of the axle-spindle and the skein or box, the several parts being so united as to form a recess, *a*, between them, substantially as described.

2. The axle-spindle, with or without the groove *d*, having the threaded nib *c*, conical follower S, recess *a*, and nut G, substantially as described.

In testimony that I claim the foregoing I have hereunto set my hand this 17th day of February, A. D. 1875.

ALFRED E. SMITH.

Witnesses:

CHARLES L. BARRITT,

THOS. W. TELL.